Dec. 26, 1933.  J. K. HODNETTE  1,940,864
ELECTRICAL APPARATUS
Filed March 11, 1933   2 Sheets-Sheet 1

WITNESSES:
E. A. McCloskey
Wm. C. Groome

INVENTOR
John K. Hodnette.
BY
Franklin E. Hardy
ATTORNEY

Dec. 26, 1933.   J. K. HODNETTE   1,940,864
ELECTRICAL APPARATUS
Filed March 11, 1933   2 Sheets-Sheet 2
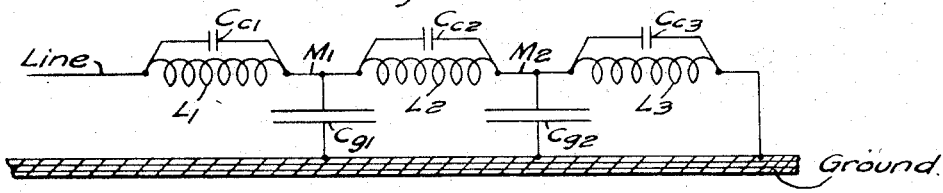
Fig. 5.
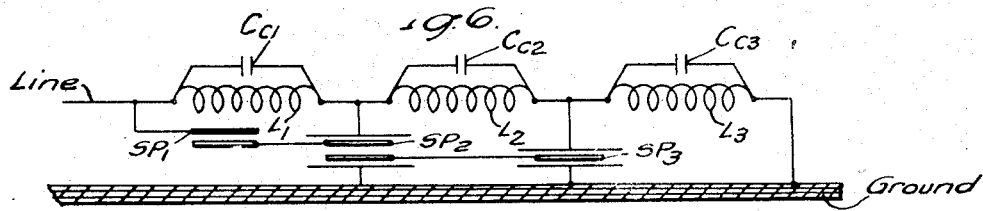
Fig. 6.
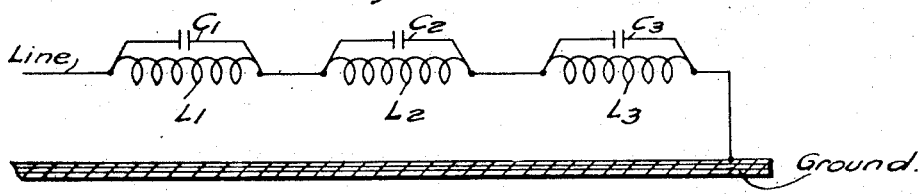
Fig. 7.
Fig. 8.
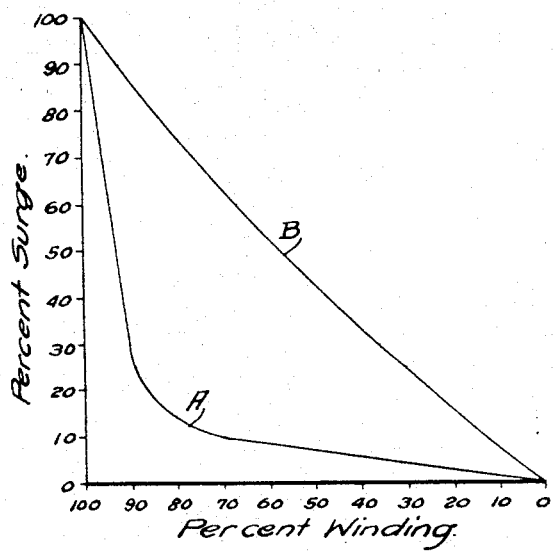
WITNESSES:
INVENTOR
John K. Hodnette.
BY Franklin E. Hardy
ATTORNEY Patented Dec. 26, 1933

1,940,864

UNITED STATES PATENT OFFICE 1,940,864

ELECTRICAL APPARATUS

John K. Hodnette, Sharon, Pa., assignor to Westinghouse Electric & Manufacturing Company, East Pittsburgh, Pa., a corporation of Pennsylvania Application March 11, 1933. Serial No. 660,357

13 Claims. (Cl. 175—356)

My invention relates to methods and means for improving the electrostatic distribution of surge voltages in the windings of electrical apparatus.

In the windings of electrical apparatus, such as transformers, that are connected to a transmission line, the voltage between the terminals of a winding varies uniformly from one end of the winding to the other, under normal frequency and voltage conditions of the system. However, during certain conditions of the system, such as may be caused by lightning or by switching operations on the transmission line, a high voltage surge may occur on the transmission line and enter the winding of the transformer.

In windings of the usual construction, a voltage surge will not immediately distribute itself along the winding in a manner to establish a uniform voltage gradient, but its initial distribution produces a high concentration of voltage stress on parts of the winding connected near to the line terminal. This initial voltage gradient results from the values of the electrostatic conditions existing between the winding and ground and between adjacent portions of the winding, such as between different winding turns or groups of turns.

Because of the inductance of the winding, a redistribution of energy from the electrostatic state takes place in the winding causing oscillations of the voltage values therein about its final or uniform distributed value that are caused by the inductance and capacity of the winding. These oscillations create successive voltage stresses between adjacent parts of the winding and between the winding and ground.

The problem of insulating the conductors and coils of a transformer winding to withstand the surge voltages impressed upon them is a difficult one, because in the usual construction of these parts the conductors are so small that satisfactory means of applying sufficient insulation to withstand the voltage stresses are not readily available. If sufficient insulating material is applied about the conductors, the space factor between the conductors would become so large as to affect the efficiency of the design. It is, therefore, desirable to provide means for lessening the voltage stresses between the several parts of the winding that are caused by the concentration of surge voltages in order to produce satisfactory operation of the apparatus.

It is an object of my invention to provide electrostatic plates in an electrical apparatus so positioned and dimensioned as to substantially neutralize the capacitance current of the winding to ground upon the occurrence of a rapid change in voltage across the winding of the electrical apparatus.

Another object of my invention is to provide means for protecting the winding of an electrical apparatus from the transient voltage distribution effect of a surge entering the winding.

Another object of my invention is to provide a capacity network for electrical windings comprising a plurality of static plates that is balanced electrostatically to correspond in its voltage distribution of the inductance network of the winding.

A further object of my invention is to provide a plurality of electrostatic plates in the space between a winding and ground so dimensioned and positioned as to provide a substantially uniform voltage distribution in the space between the winding and ground.

In the drawings:

In Figs. 2 and 4 windings and electrostatic plates in one window of the core only is shown, it being understood that the structure shown is duplicated on the other side of the winding leg of the transformer.

Fig. 5 is a diagram illustrating an equivalent network circuit of the usual core type transformer winding;

Figs. 6 and 7 are diagrams illustrating equivalent network circuits employing electrostatic plates arranged in accordance with my invention; and Fig. 8 is a diagram illustrating curves showing the initial surge voltage distribution in a transformer.

Figure 1:
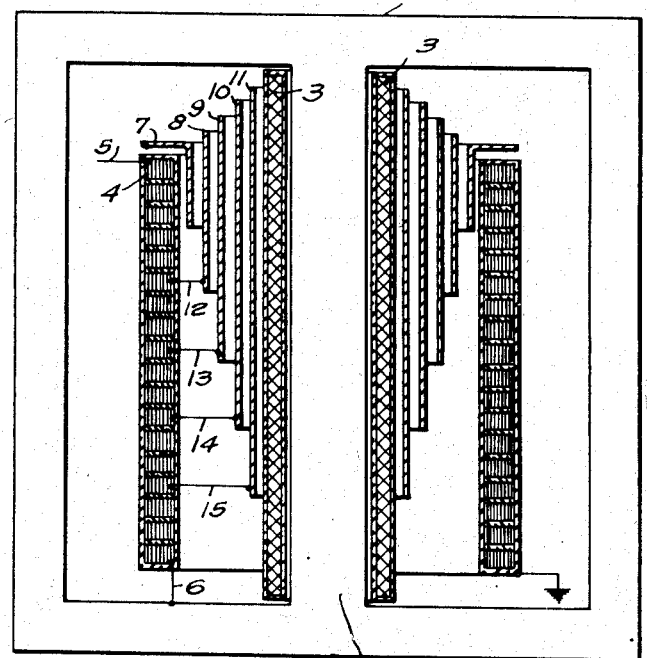
Figure 1 is a vertical sectional view of the windings of a core type transformer showing electrostatic plates arranged in accordance with one embodiment of my invention.

Referring to the drawings, and more particularly to Fig. 1 thereof, a core structure 1 is illustrated having a winding leg 2, about which is positioned a low-tension winding 3 and a high-tension winding 4, that comprises a stack of coils connected in series between winding terminals, which may, as illustrated, be a high-tension terminal 5 and a grounded terminal 6. The high-voltage end of the winding 4 is provided with a line static plate 7 that extends across the end of the winding and downwardly along one side thereof between the high-voltage and low-voltage windings.

A second electrostatic plate 8, that is capacitively coupled to the line static plate 7, is positioned in the high-to-low space between the windings 3 and 4 and spaced from the line static plate 7. The plate 8 extends downwardly along the winding opposite a point in the high-voltage winding which, for the condition of uniform voltage distribution, has a potential corresponding to the potential of the plate. Thus, the equipotential surface of the plate will intersect the winding in such location as to effect a substantially even distribution of voltage along the winding.

A plurality of electrostatic plates in addition to the plate 8 and similarly coupled to the adjacent plates in series between the high-voltage winding and the low-voltage winding may be employed, such as plates 9, 10 and 11, illustrated. The plate 9 is electrostatically coupled to the plate 8, and is spaced therefrom and extends downwardly in the high-to-low space between the windings 3 and 4, adjacent a point in the high-voltage winding 4, the normal voltage of which corresponds substantially to the voltage of the electrostatic plate 9. The plates 10 and 11 are similarly coupled in series, each with the adjacent plate, and extend downwardly in the high-to-low space adjacent points in the high-voltage winding, the normal voltage of which corresponds to the voltage of the electrostatic plate. The several electrostatic plates 8, 9, 10 and 11 are shown connected to the winding, by conductors 12, 13, 14 and 15, at points in the winding which correspond to the voltage of the several electrostatic plates.

The area, position and extension of the electrostatic plates are so designed in relation to the winding 4 that the capacity network of the winding resulting from the combined effect of the series of plates is balanced electrostatically to correspond in voltage distribution to the voltage distribution of the equivalent inductance network of the winding 4. In order to provide for a uniform surge voltage distribution throughout the winding, the design of the electrostatic plates should be such that the capacity current supplied to each electrostatic plate of the series from the plate of next higher potential, must exceed that supplied by it to the plate of next lower potential in the series by the amount of the leakage current to ground from that portion of the winding connected between the given plate and the plate of the series having the next lower potential.

Figure 3:
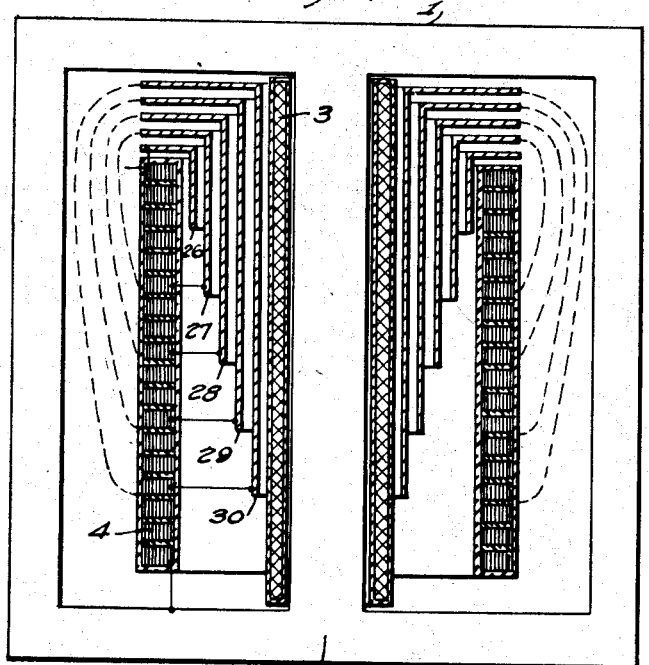
Fig. 3 is a vertical sectional view of a transformer showing another embodiment of my invention.

Equi-potential surfaces of the electrostatic field corresponding to the potentials of the electrostatic plates are, with the construction employed, carried well down the winding stack, thus effecting a much more evenly distributed voltage along the stack than would exist if the voltage stress were concentrated about the high-voltage end of the winding, as is the case in the usual type of winding. The general arrangement of the equi-potential surfaces is shown in Fig. 3 by the dotted lines extending from the several electrostatic plates to the points along the high-voltage winding having the corresponding voltage.

The diagram in Fig. 5 of the drawings represents the simplified equivalent circuit of a conventional core type winding. The capacity to ground of the winding is represented by capacities $C_{g1}$ and $C_{g2}$. The capacities $C_{c1}$, $C_{c2}$ and $C_{c3}$ represent capacities between groups of turns or across the segments of the winding, and the inductances $L_1$, $L_2$ and $L_3$ represent the inductance of these winding segments. $M_1$ and $M_2$ represent the mutual inductance between segments of the winding.

The initial or electrostatic voltage distribution of a steep front surge in a conventional core type winding is determined by the electrostatic or capacity network of the winding and is represented by the curve A in Fig. 8. The final distribution of voltage is determined by the inductance network of the winding and is practically uniform, as shown by the curve B in Fig. 8.

The diagram of Fig. 6 is a modification of the equivalent circuit of the diagram in Fig. 5 caused by placing electrostatic plates to balance the capacity network of the winding, such as are provided in Fig. 1 of the drawings. For the sake of simplicity, the diagram in Fig. 6 is drawn for an arrangement employing two electrostatic plates between the line static plate and the low-voltage winding of the transformer. Any number of plates may be used, the design of the plates being such that the result of the several capacities between the winding and ground balances the capacity network of the winding.

In the diagram of Fig. 6, $SP_1$ represents the line static plate connected to the high-voltage terminal of the winding, and $SP_2$ and $SP_3$ represent two static plates coupled in series between the line static plate and ground. The electrostatic network of the capacity element illustrated in the diagram is balanced to give a uniform initial voltage distribution corresponding to the final distribution represented by the curve B in Fig. 8.

Since the effect of the electrostatic plates shown in the equivalent circuit of Fig. 6 is to balance the electrostatic network to give a uniform initial voltage distribution corresponding to the final distribution of the winding, the equivalent circuit of the winding may be represented by the circuit of Fig. 7, in which the capacities $C_1$, $C_2$ and $C_3$ are of such value as to produce an initial uniform voltage distribution.

Referring to Fig. 8, the curve A represents the initial distribution of voltage along a winding stack of the usual type in which the capacity is unbalanced and the initial voltage distribution does not correspond to the final or uniform voltage distribution due to the inductance network. The curve B illustrates the initial distribution of a voltage surge along the winding stack 4 when the capacity network is balanced electrostatically to correspond in its voltage distribution to the voltage distribution of the inductance network, by means of electrostatic plates 8, 9, 10 and 11 of Fig. 1, or the corresponding plates shown in Figs. 2, 3 and 4. These plates extend substantially about the axis of the winding leg of the transformer core except for a gap therein to prevent them from acting as short-circuited transformer winding turns.

The function of these electrostatic plates, as will be seen from a study of the circuit diagrams in Figs. 5, 6 and 7, is, first, to neutralize the capacities between the coils and ground, and, second, to provide a more uniform dielectric field throughout the length of the winding and throughout the entire insulating structure.

The value of the capacities established by these electrostatic plates should be such that the electrostatic field established by these capacities is effective to produce a straight line gradient between the terminals of the winding 4 at the instant of impact of a high-voltage surge upon the winding.

By employing the multiple arrangement of the electrostatic plates illustrated and described herewith, each plate, beginning with the electrostatic plate 7, is capacitively coupled to the next adjacent plate of the series, and the combined arrangement of the metallic plates 7, 8, 9, 10 and 11 and ground may be so designed that uniform voltage distribution is secured, both along the winding 4 and in the major insulation between the high-voltage winding 4 and the low-voltage winding 3 or ground. The arrangement of the plates operates in principle similar to a number of condensers connected in series.

Figure 2:
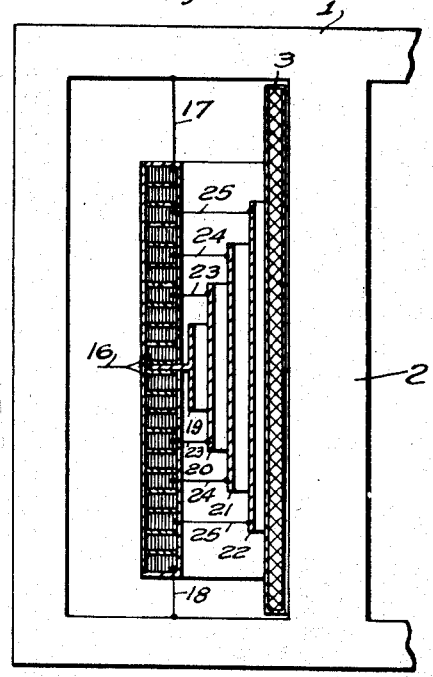
Fig. 2 is a vertical sectional view of a portion of a core type transformer showing the windings and electrostatic plates arranged in accordance with another embodiment of my invention.
Figure 4:
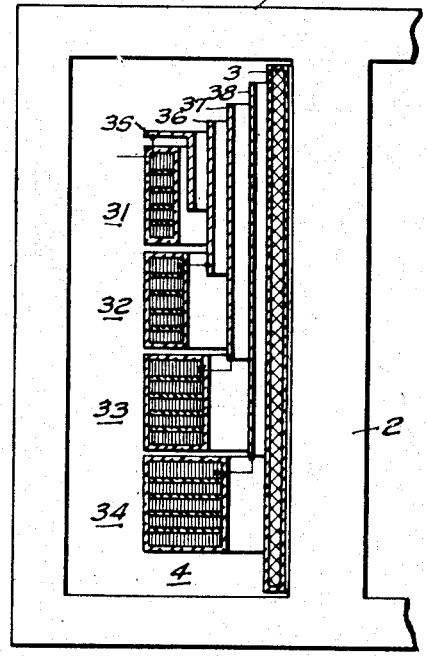
Fig. 4 is a sectional view of a portion of the windings of a core type transformer in which the several winding coils of the high-tension winding are arranged to provide for graded insulation.

The specific arrangement of the high-voltage winding coils and the electrostatic plates may be modified in detail in a number of ways, certain such modifications being shown in Figs. 2, 3 and 4 of the drawings. In the embodiment of the invention illustrated in Fig. 2, the high voltage or line conductor 16 is connected to the middle of the winding 4, thus providing two paths between the middle point or high-voltage terminal of the winding and the ends or ground terminals that are connected to ground by the conductors 17 and 18, respectively. With this arrangement of the high-voltage winding coils, the line static plate 19 that is connected to the terminal conductor 16 extends between the adjacent coils of the winding and along the winding in the high-to-low space. The electrostatic plates 20, 21 and 22 are provided, coupled in series between the line static plate 19 and the low-voltage winding 3, and extend in opposite directions from the center of the winding, terminating at points adjacent the high-voltage winding at which the normal voltages within the winding correspond to the voltages of the several electrostatic plates, at which points the electrostatic plates and the windings are connected by conductors 23, 24 and 25.

In the embodiment of the invention illustrated in Fig. 3, the electrostatic plates are arranged as illustrated in Fig. 1, excepting that all of the several electrostatic plates 26, 27, 28, 29 and 30 positioned in the high-to-low space extend across the high-voltage end of the winding 4 in the space between the winding and the yoke of the core directly above.

In the embodiment of the invention illustrated in Fig. 4, the winding 4 is divided into four sections or groups of coils 31, 32, 33 and 34, the inside diameters of which are progressively larger as the top of the high-voltage winding is approached. The increase in internal diameter of the winding stack adjacent the high-voltage end of the winding permits the insulating material between the high-voltage winding and the low-voltage winding to be graded in proportion to the voltage stress between the two windings.

The line static plate 35 is similar to that shown in Figs. 1, 2 and 3 and extends across the high-voltage end of the winding and down along the winding on the inside thereof. The several plates 36, 37, 38 are coupled between the line static plate and ground, and are connected to the upper ends of the coil groups 32, 33 and 34, respectively forming the high-voltage winding.

For the sake of clearness in illustrating the principle of the invention, the insulating material is not shown in Figs. 1, 2, 3 and 4. The metallic surfaces or electrostatic plates may be built up as integral parts of the insulating structure.

Many modifications may be made in the apparatus illustrated and described without departing from the spirit of my invention, and I do not wish to be limited other than by the scope of the appended claims.

I claim as my invention:

1. Electrical induction apparatus having a winding, means for providing a substantially uniform dielectric field throughout the length of said winding comprising a plurality of electrostatic plates in series adjacent said winding, said several plates being capacitively coupled to adjacent plates of the series and so dimensioned that the voltage distribution of the capacity network corresponds substantially to the voltage distribution of the inductance network of the winding.

2. In electrical induction apparatus, a core of magnetic material having a winding leg, a low-voltage winding about said winding leg, a high-voltage winding about said low-voltage winding, and means for providing a substantially uniform dielectric field throughout the length of said winding, comprising a plurality of electrostatic plates in spaced relation between said high-voltage winding and said low-voltage winding, said several plates being capacitively coupled to adjacent plates of the series and so dimensioned that the voltage distribution of the capacity network corresponds substantially to the voltage distribution of the inductive network of the winding.

3. Electrical induction apparatus having a winding connected between a grounded terminal and a high-voltage terminal, a plurality of spaced electrostatic plates between said winding and ground potential, said plates being so dimensioned that the capacities between adjacent plates of the group are proportional to the spacing between the plates, thus producing a uniform voltage distribution in the insulating space adjacent the winding.

4. Electrical induction apparatus having a winding, a plurality of spaced electrostatic plates between said winding and ground potential, said plates being so dimensioned that the capacities between adjacent plates of the series are proportional to the spacings between the plates and of such value that the voltage distribution of the capacity network corresponds to the voltage distribution of the inductive network of the winding.

5. Electrical induction apparatus having a winding, means for providing a substantially uniform dielectric field throughout the length of said winding comprising a plurality of spaced electrostatic plates extending for varying distances adjacent the surface of said winding and so designed to give equal capacity steps in series between the winding and ground.

6. Electrical induction apparatus having a winding, means for providing a substantially uniform dielectric field throughout the length of said winding upon a surge voltage entering the winding comprising a plurality of electrostatic plates adjacent said winding, said several plates being capacitively coupled to adjacent plates of the series and dimensioned to terminate opposite points along the winding corresponding to the normal voltage distribution of the winding.

7. Electrical induction apparatus having a winding connected between a grounded terminal and a high-voltage terminal, means for providing a substantially uniform dielectric field throughout the length of said winding upon a high-voltage surge entering the winding comprising a line static plate connected to the high-voltage end of the winding, and a plurality of electrostatic plates capacitively coupled in series between said line static plate and ground and terminating adjacent points along the winding corresponding to the normal potential of the plates.

8. In electrical induction apparatus, a core of magnetic material having a winding leg, a low-voltage winding about said winding leg, a high-voltage winding about said low-voltage winding, and means for providing a substantially uniform dielectric field throughout the length of said winding comprising a plurality of electrostatic plates in spaced relation between said high-voltage winding and said low-voltage winding and terminating adjacent points along the high-voltage winding where the normal voltage of the plates and the winding correspond.

9. In electrical induction apparatus, a core of magnetic material having a winding leg, a low-voltage winding about said winding leg, a high-voltage winding about said low-voltage winding, and means for providing a substantially uniform dielectric field throughout the length of said winding comprising a plurality of electrostatic plates in spaced relation adjacent said high-voltage winding, said several plates being capacitively coupled to adjacent plates of the series and so dimensioned that the voltage distribution of the capacity network corresponds substantially to the voltage distribution of the inductive network of the winding.

10. Electrical induction apparatus having a winding connected between a grounded terminal and a high-voltage terminal, a plurality of spaced electrostatic plates between said winding and ground potential and extending from the high-voltage end thereof along the winding, said plates being so dimensioned that the capacities between adjacent plates of the group are proportional to the spacing between the plates, thus producing a uniform voltage distribution in the insulating space adjacent the winding, the ends of said several plates opposite the high-voltage ends thereof terminating at points along the high-voltage winding at which voltages corresponding to that of the plates normally exist.

11. Electrical induction apparatus having a low-voltage winding and a high-voltage winding surrounding the low-voltage winding and connected between a grounded terminal and a high-voltage terminal, means for providing a substantially uniform dielectric field throughout the length of the winding comprising a line static plate connected to and extending across the high-voltage end of the winding and along the winding in the space between the high-voltage and the low-voltage windings, and a plurality of electrostatic plates capacitively coupled in series between said line static plate and ground.

12. In electrical induction apparatus, a core of magnetic material having a winding leg, a low-voltage winding about said winding leg, a high-voltage winding about the low-voltage winding, and means for protecting said high-voltage winding from the effect of surge voltages comprising a plurality of electrostatic plates in series in the space between the high-voltage and low-voltage windings, said several plates being capacitively coupled to adjacent plates of the series and so dimensioned that the voltage distribution of the capacity network corresponds to the voltage distribution of the inductance network of the winding.

13. In electrical induction apparatus, a core of magnetic material having a winding leg, a low-voltage winding about said winding leg, a high-voltage winding surrounding the low-voltage winding and connected between a grounded terminal and a high-voltage terminal, and means for protecting said high-voltage winding from the effect of surge voltages comprising a line static plate connected to and extending across the high-voltage end of the winding and along the winding in the space between the high-voltage and low-voltage windings and a plurality of electrostatic plates capacitively coupled in series between said line static plate and ground in the space between the high-voltage and low-voltage windings and so dimensioned that the voltage distribution of the capacity network corresponds to the voltage distribution of the inductive network of the winding.

JOHN K. HODNETTE.